United States Patent
Willmot

(10) Patent No.: US 10,728,832 B2
(45) Date of Patent: Jul. 28, 2020

(54) RELATING TO TELECOMMUNICATIONS NETWORKS

(71) Applicant: BAE SYSTEMS plc, London (GB)

(72) Inventor: Robert Eardley Willmot, Dorchester (GB)

(73) Assignee: BAE SYSTEMS plc, London (GB)

( * ) Notice: Subject to any disclaimer, the term of this patent is extended or adjusted under 35 U.S.C. 154(b) by 5 days.

(21) Appl. No.: 16/311,964

(22) PCT Filed: Jun. 14, 2017

(86) PCT No.: PCT/GB2017/051735
§ 371 (c)(1),
(2) Date: Dec. 20, 2018

(87) PCT Pub. No.: WO2017/220970
PCT Pub. Date: Dec. 28, 2017

(65) Prior Publication Data
US 2019/0208461 A1    Jul. 4, 2019

(30) Foreign Application Priority Data

Jun. 23, 2016 (EP) ..................... 16275086
Jun. 23, 2016 (GB) ..................... 1610963.9

(51) Int. Cl.
*H04W 48/04* (2009.01)
*H04W 16/14* (2009.01)
(Continued)

(52) U.S. Cl.
CPC ........... *H04W 48/04* (2013.01); *H04W 16/14* (2013.01); *H04W 28/18* (2013.01); *H04W 48/16* (2013.01); *H04W 88/12* (2013.01)

(58) Field of Classification Search
CPC ..... H04W 48/04; H04W 16/14; H04W 28/18; H04W 48/16; H04W 88/12
See application file for complete search history.

(56) References Cited

U.S. PATENT DOCUMENTS

2008/0233938 A1   9/2008   Bradley et al.
2011/0143761 A1   6/2011   Uusitalo et al.
(Continued)

FOREIGN PATENT DOCUMENTS

GB    2517795 A      3/2015
WO    2011/163055 A1   12/2011
(Continued)

OTHER PUBLICATIONS

International Search Report and Written Opinion received for PCT Application No. PCT/GB2017/051735, dated Sep. 4, 2017. 15 pages.
(Continued)

*Primary Examiner* — Ronald B Abelson
(74) *Attorney, Agent, or Firm* — Finch & Maloney PLLC

(57) ABSTRACT

Disclosed is a method of managing a plurality of individual nodes in a communication network, wherein one of the plurality of nodes is operating in the vicinity of a jurisdictional boundary and is expected to cross the boundary, comprising the steps of: a network controller retrieving, from a spectrum access database, operating parameter information for the node expected to cross the boundary, wherein the operating parameter information comprises operating parameters relating to a present location of the node and an expected future location; the network controller determining operating parameter information for use by the node, whereby the operating parameter information causes the node to comply with relevant regulations in the present and expected future location; and the network controller transmitting the determined operating parameter information to the node.

17 Claims, 2 Drawing Sheets

Figure 1:
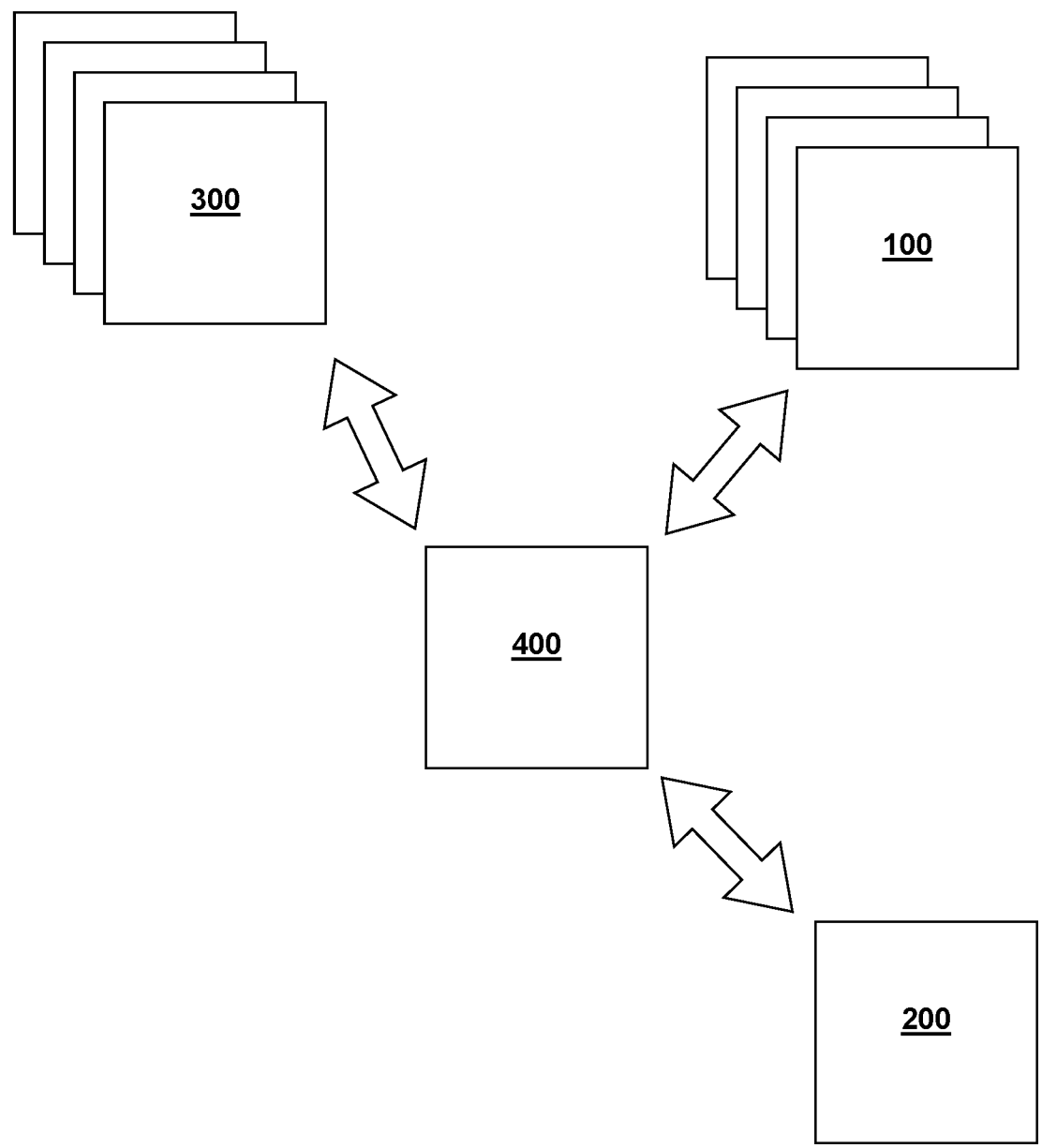

(51) Int. Cl.
    *H04W 28/18*     (2009.01)
    *H04W 48/16*     (2009.01)
    *H04W 88/12*     (2009.01)

(56) References Cited

U.S. PATENT DOCUMENTS

| | | | |
|---|---|---|---|
| 2014/0036742 A1* | 2/2014 | Charbit | H04W 76/048 |
| 2014/0135032 A1 | 5/2014 | Kim et al. | |
| 2016/0050542 A1* | 2/2016 | Stubbs | H04W 4/046 |

FOREIGN PATENT DOCUMENTS

| | | |
|---|---|---|
| WO | 2011/163059 A1 | 12/2011 |
| WO | 2017/220970 A1 | 12/2017 |

OTHER PUBLICATIONS

GB Search Report received for GB Application No. 1610963.9, dated Dec. 1, 2016. 4 pages.
Extended European Search Report received for EP Application No. 16275086.3, dated Dec. 14, 2016. 10 pages.
OFcom TV white spaces, "A consultation on white space device requirements," IEEE-SA Mentor, vol. 802.18. Nov. 22, 2012. pp. 1-67.
Yang, et al., "Resource Allocation in Cooperative Cognitive Maritime Wireless Mesh/Ad Hoc Networks: An Game Theory View," Springer International Publishing, Aug. 1, 2015. 12 pages.
Alemseged, Yohannes, "Channel list request/response for multiple geo-locations," IEEE 802.11af-10/1234r2, Nov. 2010. 9 pages.
International Preliminary Report on Patentability received for PCT Application No. PCT/GB2017/051735, dated Jan. 3, 2019. 9 pages.

* cited by examiner

RELATING TO TELECOMMUNICATIONS NETWORKS

The present invention relates to telecommunication networks and more particularly to the interoperability of different networks at a boundary between them.

Typically, telecommunication systems are operable within one or more defined frequency bands, with the allocation of the frequency bands being governed by one or more national or international authorities. However, in the case of transceivers operable on vehicles, particularly ocean-going vehicles, there is a need to adapt the operation of the transceivers at or near boundaries between different areas having different regulatory regimes.

Currently, ships and other maritime units are reliant upon specific apparatus and frequencies in order to gain access to global communications networks such as the internet. Further, equipment operation often requires a license from the relevant national spectrum regulatory body, e.g. in the UK this is the government agency 'Ofcom'. Similar agencies exist and regulate activity in other countries.

The regulatory body dictates certain operating parameters for transceiver nodes. Such parameters typically include frequency, bandwidth and transmission power. These are selected so as to minimise interference with other users and ensure effective co-existence of different users within the limited spectrum available.

Presently, a great deal of operator skill and/or effort is required in order to ensure that different and sometimes competing requirements are complied with. This is because present systems tend to be discrete bespoke collections of individual subsystems with little or no commonality of user interface. As a consequence, a high level of operator skill and expertise is usually required.

It is an aim of embodiments of the present invention to provide a control system for telecommunications networks which facilitates and eases co-operation between them, especially as operation switches from one network to another. In particular, it is an aim of embodiments of the present invention to ensure that any applicable regulations are complied with.

According to a first aspect of the present invention, there is provided a method of managing a plurality of individual nodes in a communication network, wherein one of the plurality of nodes is operating in the vicinity of a jurisdictional boundary and is expected to cross the boundary, comprising the steps of: a network controller retrieving, from a spectrum access database, operating parameter information for the node expected to cross the boundary, wherein the operating parameter information comprises operating parameters relating to a present location of the node and an expected future location; the network controller determining operating parameter information for use by the node, whereby the operating parameter information causes the node to comply with relevant regulations in the present and expected future location; and the network controller transmitting the determined operating parameter information to the node.

In an embodiment, the spectrum access databases comprises a plurality of spectrum access databases, remote from the network and each associated with a different jurisdiction.

In an embodiment, the spectrum access database is a local spectrum access database, hosted within the network.

In an embodiment, if the network controller is unable to determine operating parameter which causes the node to comply with relevant regulations in the present and expected future location, then operating parameter information is determined according to the present location of the node.

In an embodiment, if access to the spectrum access database is not possible, then the network controller either instructs each node to operate according to a default set of operating parameters, or instructs each node to cease transmitting.

In an embodiment, the jurisdictional boundary relates to a geographical border between two or more areas where different rules or regulations concerning applicable communications networks may apply.

In an embodiment, the network is a maritime network and individual nodes are related to vessels.

In an embodiment, the network is configured to operate in the frequency range 400-800 MHz. This is generally known as the UHF band.

In a second aspect, there is provided a network controller arranged to manage a plurality of individual nodes in a communication network, wherein one of the plurality of nodes is operating in the vicinity of a jurisdictional boundary and is expected to cross the boundary, the network controller being operable to: retrieve, from a spectrum access database, operating parameter information for the node expected to cross the boundary, wherein the operating parameter information comprises operating parameters relating to a present location of the node and an expected future location; determine operating parameter information for use by the node, whereby the operating parameter information causes the node to comply with relevant regulations in the present and expected future location; and transmit the determined operating parameter information to the node.

In an embodiment, a communications network is provided comprising the network controller of the second aspect and further comprising a plurality of transceivers arranged to communicate with the network controller.

According to the present invention there is provided an apparatus and method as set forth in the appended claims. Other features of the invention will be apparent from the dependent claims, and the description which follows.

Figure 2:
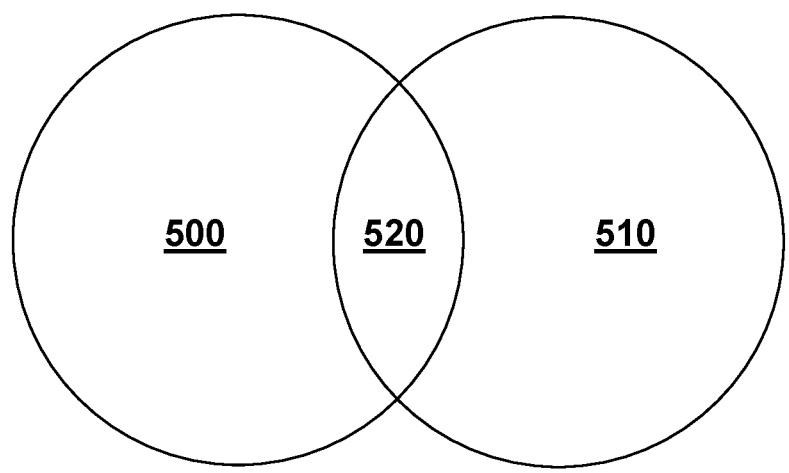

For a better understanding of the invention, and to show how embodiments of the same may be carried into effect, reference will now be made, by way of example, to the accompanying diagrammatic drawings in which:

FIG. 1 shows a representation of a network according to an embodiment of the invention; and FIG. 2 represents differing operating parameters in the vicinity of a jurisdictional boundary.

FIG. 1 shows a representation of the overall structure of an embodiment of the present invention. Embodiments of the invention will be described in the context of a maritime setting, but this is not to be regarded as limiting and embodiments of the present invention may be utilised in any environment, as needed. In particular, land-based vehicles and aircraft may also benefit from embodiments of the present invention.

FIG. 1 shows a representation of the general structure of an embodiment of the invention. At the centre of the system is a network controller 400 which communicates with the other entities. These other entities are:

- multiple network radio nodes 100, each of which includes one or more transceivers;
- a local dynamic spectrum access database 200; and
- multiple host nation spectrum access databases 300.

Each of these entities will be described in turn. The plurality of network radio nodes 100 comprise individual transceivers, each located on an individual vessel. These vessels are typically boats or ships and each is operable to communicate with one or more of the other nodes. The nodes may be configures to operate as an ad-hoc network, but this is not critical to the understanding of embodiments of the present invention.

Each of the nodes must individually comply with the regulations imposed by the authority in whose jurisdiction it is operating. In the case of prior art systems, where each node can select from a wide range of channels, perhaps agreed with other nodes with which communication is planned, this is normally trivial. However, in a scenario where frequency allocations are variable and may be assigned dynamically from a shared pool of possible resources, managing frequency allocation between nodes while simultaneously ensuring that applicable regulations are complied with as nodes move near and across regulatory boundaries, this is more problematic.

The individual nodes may comprise off the shelf transceiver units, which are controlled according to an embodiment of the present invention. The transceiver units in each node may operate according to one or more technical standard. They may operate in the domain known as TV White Space (TVWS), which is a frequency band lying approximately at 400-800 Mhz (known as the UHF band), which has been largely vacated by analogue TV services and is available for other uses. However, the allocation of frequencies within this band is controlled and allocated dynamically, requiring some form of central controller. Control is achieved via the network controller 400, to be described later.

The network controller 400 is operable to communicate with spectrum access databases 300 in various host countries. For instance, in a network where vessels are operable in international or territorial waters around the United Kingdom, then the network controller may require access to spectrum access databases of the United Kingdom, Ireland, France, Belgium, Netherlands, Germany, Denmark, Norway, Iceland and so on, depending on the extent of the network. Some of these databases are provided directly by the relevant national authority and sometimes via a commercial provider.

Frequency allocations and transmission power limits may vary from state to state, making it difficult for nodes which cross boundaries to comply with the various requirements.

By accessing the databases 300 of the various countries which are, or are likely to be, relevant to the operation of the network, given the extent of the various nodes 100, the network controller is able to acquire information regarding frequency, bandwidth and transmission power to control the operation of the plurality of nodes within the network. This ensures that the network controller 400 is, at all times, aware of the correct operating parameters for nodes under its control and is further able to communicate to them the operating parameters that they should be using. Furthermore, the network controller is operable to model RF propagation between various nodes, which can be used to optimally configure each node in terms of frequency selection, in particular, thereby optimising connectivity of each node and the entire network.

The databases 300 are arranged to provide, where possible, real time data allowing dynamic allocation of operating parameters to be performed. Access is typically provided over the internet and may require prior registration or it may be open access.

In the specific scenario where all nodes are operating within the jurisdiction of a single nation's regulations, e.g. the United Kingdom, then the network control 400 accesses the UK database 300 and by using the information provided, it instructs each node which frequency, bandwidth and power to use to ensure that communication between the nodes (and beyond) complies with the relevant requirements.

If, then, a node 100 travels towards the boundary of another country's jurisdiction e.g. France, then the network controller is operable to access the database 300 of the French authorities to ascertain operating parameters for nodes operating within French jurisdiction. It is possible, given the nature of radio wave propagation, that signals from the node in question may be received both in the UK and in France (and possibly beyond). In order to properly comply with all relevant requirements, the network controller selects operating parameters for the node so that it complies with requirements for its current position (i.e. in the United Kingdom) and also with its future position (i.e. France). In this way, as the node passes from one jurisdiction to another, it is, where possible, operating in a manner which satisfies both authorities. This eases the transition between them and allows continuous operation and transfer of data.

It should be noted that in the UHF band, which is of particular interest, radio wave propagation tends to be generally omnidirectional, or not particularly directional in nature, due to the type of antenna used on the vessels or vehicles in question. There is, as such, no control which can be exercised over the extent of travel of the radio signals, which will, by definition, tend to radiate widely. This is to be contrasted with radio transmitters using satellite technology, for instance, which are highly directional and tend to propagate upwards with little surface wave.

Throughout this application, the term boundary or jurisdictional boundary is intended to relate to a geographical border between two or more areas where different rules or regulations concerning applicable communications networks may apply. This is typically, but not always, a national boundary or an agreed maritime boundary, taking into account territorial waters and the like.

The present position is of course known from navigational data for the node in question. It's expected trajectory or programmed voyage information can be used to determine its future location so that details from the relevant host nation database 300 can be accessed.

In the event that there is a conflict between the requirements of the current jurisdiction and future jurisdiction, then the requirements of the current jurisdiction will prevail until such time as the node is within the next jurisdiction, at which time, its requirements will prevail. In this scenario, as soon as possible after crossing the boundary from one jurisdiction to the next, the node is provided with new operating parameters, which have been sourced and retrieved in advance so that minimal time is lost in re-tuning the transceiver for its new operating parameters.

Wherever possible, in the vicinity of a jurisdictional boundary, then the node will attempt to operate with parameters which satisfy the requirements of the current and expected future authority. This is illustrated in FIG. 2, which shows a Venn diagram. The set 500 represents operating parameters associated with the present jurisdiction. The set 510 represents operating parameters associated with the expected future jurisdiction. The common elements 520 of both sets represent operating parameters which satisfy both the present and expected future jurisdiction.

In theory, the size of overlap can vary between 0%, where there are no common parameters and 100% where both jurisdictions share parameters exactly. In practice, there is likely to a finite common set, which is smaller than 100%. In the vicinity of the boundary, the node will be instructed to operate using operating parameter from the common set 520 so that both jurisdiction's requirements can be satisfied. If that is not possible, then operation will continue using the parameters of the present jurisdiction until such time as the node crosses the boundary into the new jurisdiction, at which time, its operational parameters will be utilised.

This principle can be extended to situations where a node may travel such that it arrives at an intersection between more than 2 different jurisdictions. As an example, the town of Aachen in Germany lies just over the border from both Belgium and the Netherlands, so if a vehicle driving in this area wishes to transmit, it is preferable for it to comply with the requirements of the German, Dutch and Belgian authorities, if possible. As stated before, if this is not possible, then the requirements of the current host nation should be prioritised.

In case access to the multiple host nation spectrum access databases 300 is not possible for any reason, such as a lack of connectivity or a remote system being unavailable, then reference can be made to the local dynamic spectrum access database 200 which is available within the overall network. The exact location of the local dynamic spectrum access database is not important, provided it is accessible to the network controller 400. As such, it is usually more convenient for it to be collocated with the network controller, but it may be physically located elsewhere. Indeed, it may itself be replicated and available at several different physical locations, depending on the exact makeup of the network in question.

The local dynamic spectrum access database 200 includes information sourced from the multiple databases 300 of the various countries which are, or are likely to be, relevant to the operation of the network. Such information may include details of the mechanisms for joining/complying with the requirements of each particular scheme in each jurisdiction. Details for each host country may be retrieved from the multiple databases 300 and entered into the local database 200 periodically, so that a relatively current version of the information is always available somewhere within the network.

In the event that the local dynamic spectrum access database is acting as the source for spectrum allocation parameters, then care must be taken to ensure that it operates within applicable standards. For instance, ETSI EN 301 598 governs such behaviour in section 4.2.6 particularly. Other applicable standards may apply in other cases.

In this way, even if up to date information is not available from the multiple databases 300, a version of the same is available from the local database 200, including information related to countries or jurisdictions of interest, such as those surrounding or near to the expected trajectory of nodes in the network.

It is further possible to define a default mode for each node which is used in the event that there is no information available from either the multiple databases 300 or the local database 200. Such a default mode would be programmed into each node and would define an operational mode intended to cause minimal interference while still complying with the base level requirements in most or all jurisdictions. The default mode may be one mode for all jurisdictions or there may be defined a default mode on a per-country basis, where node in question is able to determine its position, at with regards to which country it is in and establish an operation mode accordingly.

The network controller 400 may be configured to shut down a node or the entire network in the event of one or more transmissions breaching the regulations. This may be determined on the basis of modelling of the network operation or monitoring of individual nodes. Alternatively or in addition, dynamic spectrum access may be denied if the regulations are breached, resulting in a much reduced transmission power across the network and a minimal level of capability.

In the maritime example presented here, the spectrum allocation resides in the UHF band 400-800 MHz, but other frequency bands may be used as required. There is no particular limitation to this band of frequencies.

By extension, embodiments of the present invention may be used in land or air based nodes also. Various minor adjustments will be required in the case of land-based nodes. However, in air-based nodes, the possibility of transmitting within multiple jurisdictions is high, so extra care is needed to ensure that the various, sometimes competing, requirements of possible affected jurisdictions are complied with. Also, the velocity of airborne vehicles may mean that changeovers between different jurisdictions happen more frequently than in land or sea-based nodes. As such, it may be necessary to acquire route data and retrieve details of the next jurisdiction earlier than in a sea or and-based node so that operating parameters can be changed in a timely manner.

Embodiments of the present invention allow a communications network to be controlled in a manner which is simple and largely transparent to a user, thereby minimising the amount of specialist user knowledge which would otherwise be required. The automatic assignment of operating parameters to each node in the network ensures that each node is always operating within the regulated ranges, based on its position. The switch from one jurisdictions to another is managed without any direct user intervention and data transfers can continue uninterrupted.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. A method of managing a plurality of individual nodes in a communication network, wherein one of the plurality of nodes is capable of operating in the vicinity of a jurisdictional boundary and is expected to cross the boundary, the method comprising:

retrieving, from a spectrum access database, a first set of operating parameter information for the node expected to cross the boundary, wherein the first set of operating parameter information comprises operating parameters relating to a present location of the node and operating parameters relating to an expected future location;

determining which operating parameter information of the first set of operating parameter information causes the node to comply with relevant regulations in both the present location and the expected future location, thereby providing a second set of operating parameter information; and transmitting the second set of operating parameter information to the node, wherein at least one of the spectrum access database includes a plurality of spectrum access databases, remote from the communication network and each associated with a different jurisdiction, and/or the spectrum access database includes a local spectrum access database, hosted within the communication network.

2. The method of claim 1, wherein if there is no operating parameter information of the first set of operating parameter information which causes the node to comply with relevant regulations in both the present location and the expected future location, then the second operating parameter information is determined according to the present location of the node.

3. The method of claim 1, wherein if access to the spectrum access database is not possible, then the method includes instructing each of one or more of the nodes to operate according to a default set of operating parameters, or instructs each node to cease transmitting.

4. The method according to claim 1, wherein the jurisdictional boundary relates to a geographical border between two or more areas where different rules and/or regulations concerning applicable communications networks apply.

5. The method of claim 1, wherein the communication network is a maritime network and individual nodes are related to vessels.

6. The method of claim 1, wherein the communication network is configured to operate in the frequency range 400-800 MHz.

7. A network controller arranged to manage a plurality of individual nodes in a communication network, wherein one of the plurality of nodes is capable of operating in the vicinity of a jurisdictional boundary and is expected to cross the boundary, the network controller being operable to:

retrieve, from a spectrum access database, operating parameter information for the node expected to cross the boundary, wherein the operating parameter information comprises operating parameters relating to a present location of the node and operating parameters relating to an expected future location;

determine operating parameter information for use by the node, whereby the operating parameter information causes the node to comply with relevant regulations in the present and expected future location; and transmit the determined operating parameter information to the node, wherein at least one of the spectrum access database includes a plurality of spectrum access databases, remote from the communication network and each associated with a different jurisdiction, and/or the spectrum access database includes a local spectrum access database, hosted within the communication network.

8. A communications network comprising the network controller of claim 7 and further comprising a plurality of transceivers arranged to communicate with the network controller.

9. The network controller of claim 7, wherein if the network controller is unable to determine which of the operating parameter information causes the node to comply with relevant regulations in both the present location and the expected future location, then the network controller is further operable to determine operating parameter information for use by the node according to the present location of the node.

10. The network controller of claim 7, wherein the communication network is a maritime network and individual nodes are related to vessels.

11. The network controller of claim 7, wherein the communication network is configured to operate in the frequency range 400-800 MHz.

12. A network controller arranged to manage a mobile communication node in a communication network, the network controller configured to:

access a first set of operating parameter information for the node, wherein the first set of operating parameter information comprises operating parameters relating to a present location of the node and operating parameters relating to an expected future location of the node;

determine which of the first set of operating parameter information causes the node to comply with relevant regulations in both the present location and the expected future location, thereby providing a second set of operating parameter information, wherein the second set of operating parameter information is one of equal to the first set of operating parameter information, a subset of the first set of operating parameter information, or a default set of operating parameter information; and provide the second set of operating parameter information to the node, wherein if there is no operating parameter information of the first set of operating parameter information which causes the node to comply with relevant regulations in both the present location and the expected future location, then the second operating parameter information is determined according to the present location of the node.

13. The network controller of claim 12, wherein if access to the first set of operating parameter information is not possible, then the network controller is further configured to instruct the node to operate according to the default set of operating parameter information.

14. The network controller of claim 12, wherein if access to the first set of operating parameter information is not possible, then the network controller is further configured to instruct the node to not transmit.

15. The network controller of claim 12, wherein the present location and the expected future location are separated by a geographical border between two or more areas where different regulations concerning applicable communications networks apply.

16. The network controller of claim 12, wherein the communication network is a maritime network and the node is associate with a vessel.

17. The network controller of claim 12, wherein the node is configured to operate in the frequency range 400-800 MHz.

\* \* \* \* \*